May 4, 1954  F. P. SURY  2,677,181
PIPE MARKING DEVICE
Filed July 5, 1951  2 Sheets-Sheet 1

Francis P. Sury
INVENTOR.

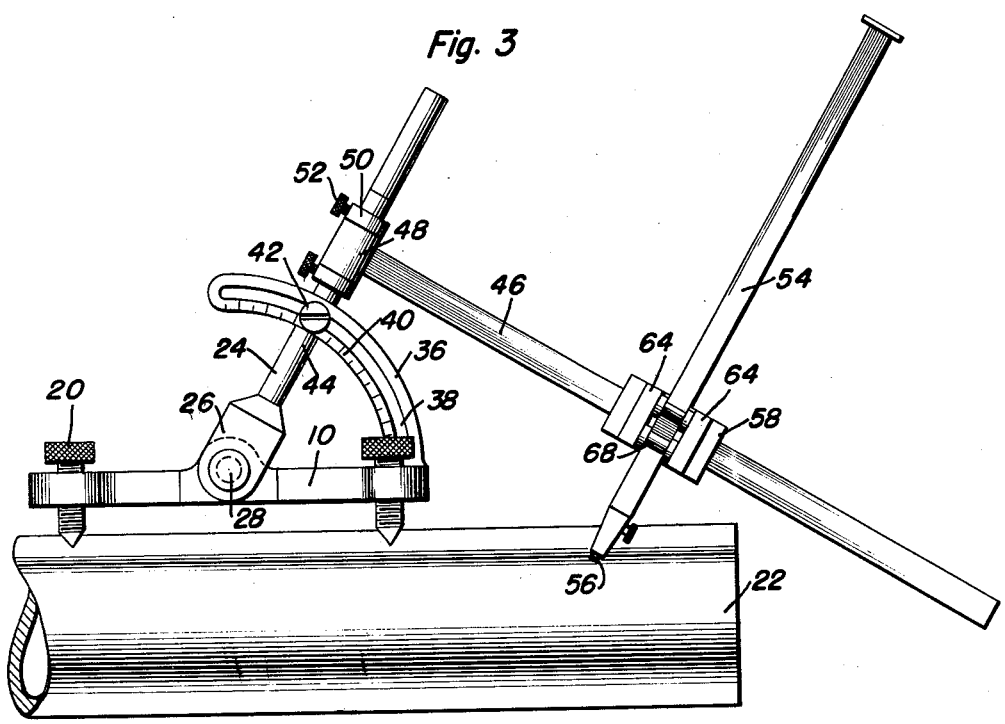
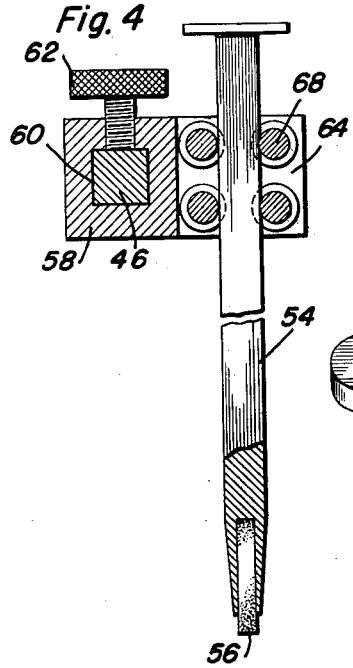
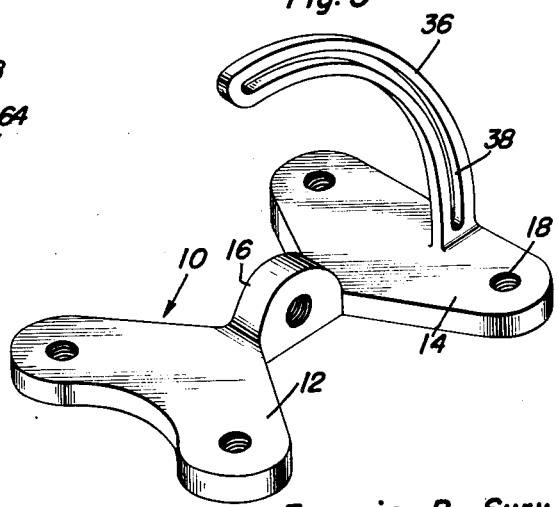
Francis P. Sury
INVENTOR.

Patented May 4, 1954

2,677,181

UNITED STATES PATENT OFFICE 2,677,181

PIPE MARKING DEVICE

Francis P. Sury, Hammond, Ind., assignor of fifty per cent to Elwood E. Stephens, Hammond, Ind.

Application July 5, 1951, Serial No. 235,137

3 Claims. (Cl. 33—21)

This invention relates to a compass for scribing circles on a tubular member of circular cross-section, such as a pipe.

The primary object of this invention is to provide a compass for scribing circles on a pipe which is relatively simple in design and construction, easy to operate, and provided with a means for yieldingly retaining the scriber arm so that the scriber point will always bear on and follow the contour of the pipe.

A further object of this invention is to provide a compass of the character described which includes a protractor means for retaining the scriber in an adjusted position to draw circles lying in a plane at an angle to the longitudinal axis of the pipe.

These, together with various ancillary objects and features of the invention which will later become apparent as the following description proceeds, are attained by the device, a preferred embodiment of which has been illustrated by way of example only in the accompanying drawings, wherein:

Figure 3 is a front elevational view of the device;

Figure 4 is a sectional view taken substantially on the plane of section line 4—4 of Figure 1; and Figure 5 is a perspective view of the base member per se.

Specific reference is now made to the drawings. In the several views in the accompanying drawings and in the following specification similar reference characters indicate corresponding elements throughout.

Figure 1:
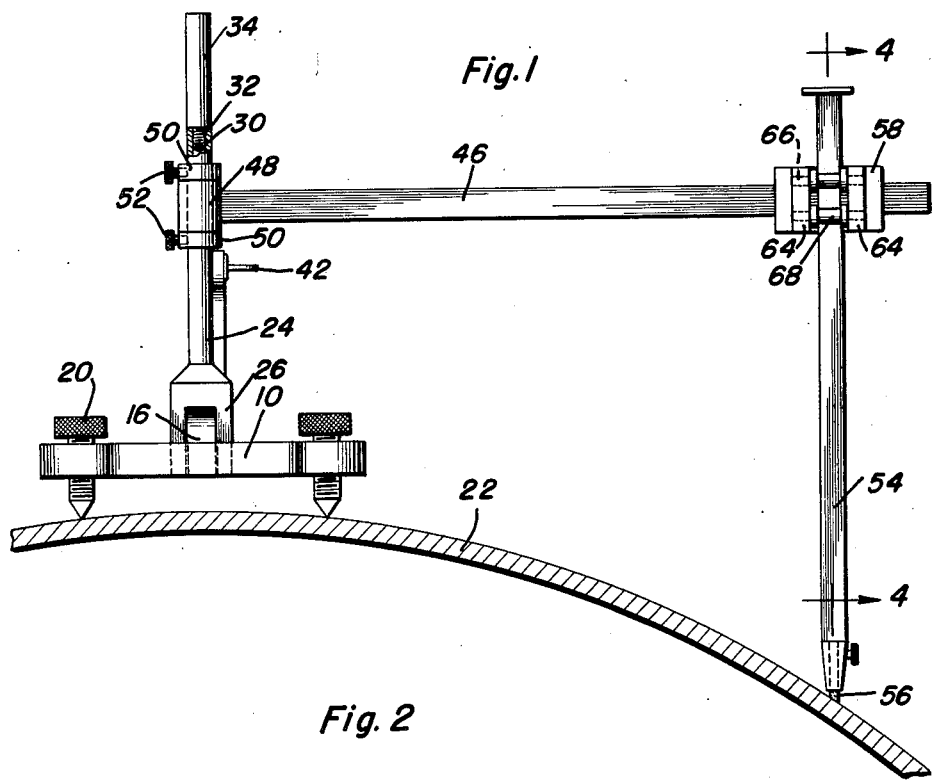
Figure 1 is a side elevational view of the device.
Figure 2:
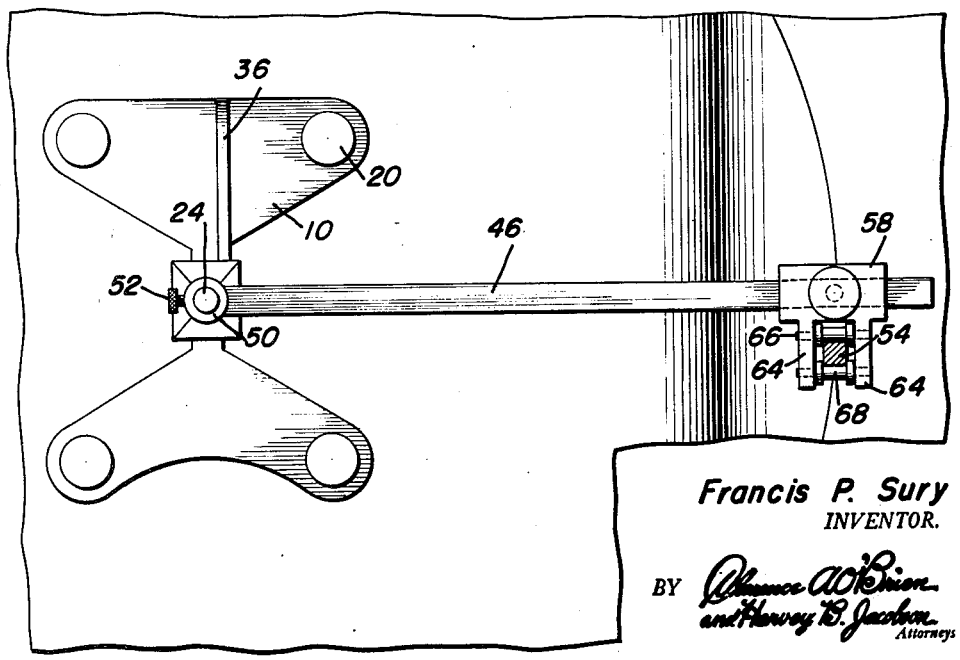
Figure 2 is a top plan view of the device.

The device comprises a base member 10 which includes two substantially V-shaped members 12 and 14 interconnected at their apices by an upstanding arcuate lug 16. Adjacent the corners of the base member threaded apertures 18 are provided for adjustably receiving pointed set screws 20 for mounting the base member in a desired location upon a tubular member of circular cross-section such as a pipe 22. A standard 24 in the form of a rod of circular cross-section is provided which has a bifurcated lower end 26 that straddles the upstanding lug 16 on the base member and a pin 28 is made to extend through the bifurcated end and through the upstanding lug 16 so that the standard is mounted on the base member for pivotal movement in a vertical plane. The upper end of the standard 24 may be provided with an internally threaded socket 30 for receiving the threaded extension 32 of another rod section 34 designed to extend the length of the standard if desired.

As will be pointed out hereinafter, the standard supports a scriber arm and to allow the scriber arm to draw circles in a plane at an angle to the longitudinal axis of the pipe 22, a means is provided for adjustably retaining the standard in any desired angular position relative to the base member 10. This means comprises an arcuate bar 36 secured at one of its ends to the base member and including an elongated arcuate slot 38 and a protractor scale 40 thereon. A headed screw 42 is made to extend through the slot and into an appropriate threaded aperture in the standard 24 whereby tightening of the screw will fixedly hold the standard in an adjusted position on the arcuate slotted arm 36. An index 44 is provided on the standard immediately adjacent the set screw for cooperation with the protractor scale 40 to determine the desired angle.

An elongated bar 46 is provided which includes a collar 48 at one of its end which is journaled on the standard 24 so that the rod is rotatable in a plane perpendicular to the longitudinal axis of the standard. To retain the bar in adjusted longitudinal position upon the standard, a pair of collars 50 embrace the standard 24 on both sides of the collar 48 and are fixedly retained on the standard by appropriate set screws 52.

A scribing arm 54 is provided which carries a marker 56 at its bottom end adapted to contact the outer surface of the pipe 22 and draw a circle thereon. A means is provided for retaining the scriber arm in adjusted longitudinal position upon the bar 46 and this means comprises a block 58 which has a longitudinal bore 60 slidably receiving the bar 46 and being retained thereon in adjusted position by means of a headed set screw 62 which extends through the block and is adapted to bear upon the bar 46.

A means is provided for yieldingly retaining the scriber arm 54 on the block 58 in such a manner that the scriber arm is vertically movable and bears upon and follows the contour of the pipe during the scribing operation. This means comprises a pair of spaced parallel laterally extending arms 64 between which are journaled by means of pintles 66 spool-shaped spaced rollers 68. As shown clearly in the drawings, the scriber arm 54 extends between and contacts the inner surfaces of the rollers and is frictionally yet yieldably retained on the block by virtue of its contact with the rollers so that the scriber arm is capable of moving vertically in and out of the block as the scriber is pivoted about the standard 24 to draw desired circles on the pipe 22.

The operation of the compass should be obvious to one skilled in the art when considering the above description and the drawings. The distance between the scribing element 56 and the center of rotation of the compass can be readily adjusted by pushing the scriber arm 54 upwardly through the rollers and moving the block 58 along the length of the bar 46 to the desired points. Further adjustment can be made by loosening the collars 50 and moving the collar 48 on the end of the bar 46 longitudinally upon the standard 24. To obtain a circle which lies in a plane parallel to the axis of the pipe 22, the standard is set by the screw 42 in a position perpendicular to the plane of the base. To scribe circles which lie in a plane of a predetermined angle relative to the longitudinal axis of the pipe 22, the standard 24 is pivoted about the pin 28 to a desired angle determined by the index 44 cooperating with the protractor scale 40 and thereafter the set screw 42 is turned to lock the standard in position upon the arcuate slotted bar 36.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A compass for scribing circles on a pipe comprising a base member including a pair of flat end plates and an upstanding lug connecting said end plates to one another, a standard pivoted at its lower end to said base member, the lower end of said standard being bifurcated, said upstanding lug being received between furcations of said bifurcated end and a pivot pin connecting said lug and said bifurcated end, means on said end plates for mounting the same on a pipe, a bar slidably journaled at one of its ends on said standard for swinging movement on a horizontal plane perpendicular to the axis of said standard, a scriber arm, means for adjusting said scriber arm longitudinally on said bar, said adjusting means including means for guidingly retaining said scriber arm perpendicular to said bar.

2. The combination of claim 1 wherein said mounting means includes a pair of pointed set screws carried on each of said end plates.

3. The combination of claim 1 wherein said adjusting means comprises a block having a pair of spaced lateral arms extending from one surface thereof, said block being slidably journaled on said bar and being adjustably secured to said bar by means of a set screw, pairs of spaced rollers extending between and secured at their ends to said spaced lateral arms, said scriber arm being received between said rollers and said arms.

References Cited in the file of this patent

UNITED STATES PATENTS

| Number | Name | Date |
| --- | --- | --- |
| 988,188 | Graham | Mar. 28, 1911 |
| 1,698,154 | Day | Jan. 8, 1929 |
| 2,164,942 | Rich et al. | July 4, 1939 |
| 2,316,951 | Grauer | Apr. 20, 1943 |
| 2,460,326 | Hooser et al. | Feb. 8, 1949 |
| 2,474,041 | Dimmock | June 21, 1949 |
| 2,497,853 | Arnold | Feb. 21, 1950 |
| 2,545,666 | Lonngren | Mar. 20, 1951 |

FOREIGN PATENTS

| Number | Country | Date |
| --- | --- | --- |
| 57,979 | Sweden | Dec. 16, 1924 |
| 545,026 | Germany | Feb. 25, 1932 |